US008674965B2

(12) United States Patent
Large et al.

(10) Patent No.: US 8,674,965 B2
(45) Date of Patent: Mar. 18, 2014

(54) SINGLE CAMERA DISPLAY DEVICE DETECTION

(75) Inventors: Timothy Large, Bellevue, WA (US); Adrian Travis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 12/949,529

(22) Filed: Nov. 18, 2010

(65) Prior Publication Data

US 2012/0127127 A1   May 24, 2012

(51) Int. Cl.
  *G06F 3/042* (2006.01)
(52) U.S. Cl.
  USPC .......................................... 345/175; 345/173
(58) Field of Classification Search
  USPC ................................................. 345/173–179
  See application file for complete search history.

(56) References Cited

U.S. PATENT DOCUMENTS

| | | | | |
|---|---|---|---|---|
| 4,688,940 | A * | 8/1987 | Sommargren et al. | 356/487 |
| 5,135,183 | A * | 8/1992 | Whitney | 244/3.16 |
| 6,040,942 | A * | 3/2000 | Bergmann | 359/485.02 |
| 6,765,193 | B2 * | 7/2004 | Sumriddetchkajorn | 250/221 |
| 7,057,594 | B1 * | 6/2006 | Russell et al. | 345/87 |
| 7,515,143 | B2 * | 4/2009 | Keam et al. | 345/175 |
| 7,519,223 | B2 | 4/2009 | Dehlin et al. | |
| 8,094,129 | B2 * | 1/2012 | Izadi et al. | 345/173 |
| 2005/0248540 | A1 | 11/2005 | Newton | |
| 2006/0114237 | A1 * | 6/2006 | Crockett et al. | 345/173 |
| 2007/0018943 | A1 * | 1/2007 | Bayrle et al. | 345/102 |
| 2007/0124694 | A1 | 5/2007 | Van De Sluis et al. | |
| 2007/0200970 | A1 | 8/2007 | Keam et al. | |
| 2008/0089090 | A1 | 4/2008 | Bathiche et al. | |
| 2008/0121442 | A1 | 5/2008 | Boer et al. | |
| 2008/0122803 | A1 * | 5/2008 | Izadi et al. | 345/175 |
| 2009/0102800 | A1 | 4/2009 | Keenan | |
| 2009/0139778 | A1 | 6/2009 | Butler et al. | |
| 2009/0161051 | A1 * | 6/2009 | Fukunaga et al. | 349/115 |

(Continued)

FOREIGN PATENT DOCUMENTS

WO    2005057399 A2    6/2005

OTHER PUBLICATIONS

"Introducing the NextWindow 1900 Optical Touch Screen", Retrieved at << http://www.walkermobile.com/NextWindow_1900_White_Paper.pdf >>, A NextWindow White Paper, May 22, 2007, pp. 13.

(Continued)

*Primary Examiner* — Alexander Eisen
*Assistant Examiner* — Nelson Lam
(74) *Attorney, Agent, or Firm* — Jeremy Snodgrass; Glen Johnson; Micky Minhas

(57) ABSTRACT

Various embodiments related to determining a distance of an object from a surface of an interactive display device are disclosed herein. For example, one disclosed embodiment provides a method comprising, directing infrared (IR) light to the object above the surface which is reflected by the object back to the interactive display device, and refracting IR light reflected from the object into two rays travelling in different directions based on a polarization state of the reflected IR light. The method further comprises switching a polarization state of an LCD device to allow one of the two refracted rays to pass through the LCD device, and receiving, at a detector, the one of the two refracted ray that passes through the LCD device. Further, the method comprises estimating a distance of the object from the surface based on triangulation.

20 Claims, 3 Drawing Sheets

(56) References Cited

U.S. PATENT DOCUMENTS

| | | |
|---|---|---|
| 2010/0060722 A1 | 3/2010 | Bell |
| 2010/0164891 A1 | 7/2010 | Hill et al. |
| 2010/0271684 A1* | 10/2010 | Woodgate et al. ............ 359/256 |
| 2010/0302196 A1* | 12/2010 | Han et al. ...................... 345/173 |
| 2010/0302209 A1* | 12/2010 | Large ............................. 345/175 |
| 2010/0315360 A1* | 12/2010 | Lee ................................ 345/173 |
| 2011/0043490 A1* | 2/2011 | Powell et al. ................. 345/176 |
| 2011/0102372 A1* | 5/2011 | Han et al. ...................... 345/175 |
| 2011/0115747 A1* | 5/2011 | Powell et al. ................. 345/175 |
| 2011/0115749 A1* | 5/2011 | Yi et al. ......................... 345/175 |
| 2012/0127084 A1* | 5/2012 | Large et al. ................... 345/173 |
| 2012/0127128 A1* | 5/2012 | Large et al. ................... 345/175 |
| 2012/0229422 A1* | 9/2012 | Hwang et al. ................. 345/175 |

OTHER PUBLICATIONS

"Microsoft Surface", Retrieved at << http://en.wikipedia.org/wiki/Microsoft_Surface >>, Apr. 17, 2008, pp. 6.

"A virtual touch pad to assist in driving windows with touch input", U.S. Appl. No. 12/163,746, filed Jun. 27, 2008.

Katz, Sagi et al., "Enhancing Presentations Using Depth Sensing Cameras", U.S. Appl. No. 12/748,231, filed Mar. 26, 2010, 46 pages.

"International Search Report", Mailed Date: May 21, 2012, Application No. PCT/US2011/059611, Filed Date: Nov. 7, 2011, pp. 10.

\* cited by examiner

SINGLE CAMERA DISPLAY DEVICE DETECTION

BACKGROUND

Display devices may utilize various technologies for displaying images, such as cathode ray tube (CRT) technologies, projection-based technologies, liquid crystal display (LCD)—based technologies, etc. Some display devices may be interactive display devices which are also configured to detect touches of physical objects on a surface of the display, using technologies such as capacitive detection, resistive detection, surface acoustic wave detection, optical detection, etc. In some examples, optical detection technologies may be further configured to detect "near-touches" of physical objects located near a surface of the display.

As an example, two cameras pointing in the same direction but separated by a known distance may be used to capture two images of an object near the surface from different points of view. The two images may then be processed to reveal parallax data about the object which is related to depth. Very careful calibration is required, however, to ensure that the two cameras are effectively pointing in the same direction.

SUMMARY

Various embodiments related to estimating the distance of an object from a surface of an interactive display device are disclosed herein. For example, one disclosed embodiment provides a method for determining a distance of an object from a surface of an interactive display device with a liquid crystal display (LCD) device. The method comprises directing infrared (IR) light to the object above the surface of the interactive display device, the IR light being reflected by the object back to the interactive display device. Next, the method comprises refracting IR light reflected from the object into two rays travelling in two different directions based on a polarization state of the reflected IR light. The method further comprises switching a polarization state of the LCD device to allow a first of the two refracted rays to pass through the LCD device, and receiving, at a detector, the first of the two refracted rays that passes through the LCD device. Next, the method comprises switching the polarization state of the LCD device to allow a second of the two refracted rays to pass through the LCD and receiving, at the detector, the second of the two refracted rays that passes through the LCD device. Finally, the method comprises estimating a distance of the object from the surface of the interactive display device based on triangulation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure provides for an interactive display device which may detect the presence of an object on or near a surface of the interactive display device as well as estimate a distance of an object that is near the surface. The interactive display device includes a liquid crystal display (LCD) device, a birefringent prism, and a single camera. The birefringent prism is used to refract a ray of light reflected from the object into two rays travelling in two different directions such that the two rays of refracted light enter the LCD device separated by a distance. The LCD device may be modulated such that only one of the two refracted rays of light passes through and is received by the camera at a given time. As such parallax data related to depth may be obtained and the distance of the object from the surface may be estimated using triangulation. Various embodiments of the interactive display device are described in more detail as follows.

Figure 1:
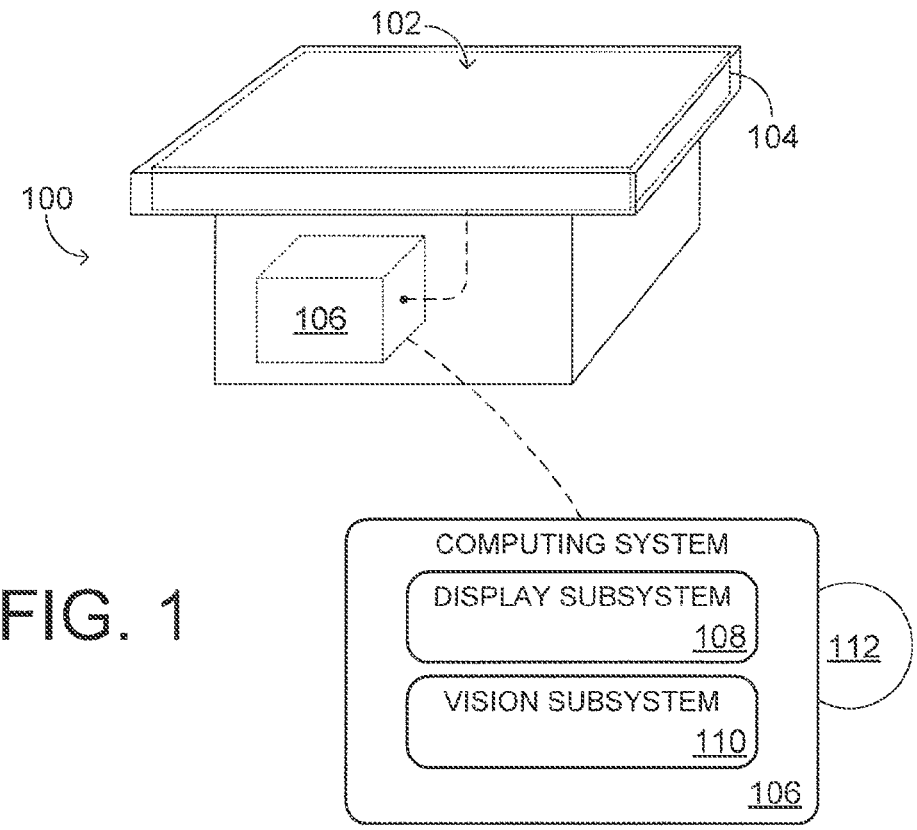
FIG. 1 shows an example interactive display device with a computing system in accordance with an embodiment of the present disclosure.

FIG. 1 shows aspects of an example embodiment of an interactive display device 100 with a touch-sensitive display surface 102 and an optical system 104, located below the touch-sensitive display surface 102, which may be configured to provide both display and vision functionality for a computing system 106. Accordingly, FIG. 1 shows computing system 106 operatively coupled to the optical system 104. The computing system 106 may be any device configured to provide display data to and receive input data from the optical system 104. In some embodiments, the computing system 106 may comprise all or part of a computer; in other embodiments, the computing system 106 may be any device operatively coupled to a computer via a wired or wireless communications link.

As shown in the example of FIG. 1, the computing system 106 includes a display subsystem 108 and a vision subsystem 110. Display subsystem may be configured to display an image on the surface 102 of the interactive display device 100 with which a user interacts via the optical system 104. Vision subsystem may be configured to detect an object on or above the surface 102 of the interactive display device 100 via the optical system 104. To provide display functionality, optical system 104 may be configured to project a visible image onto the touch-sensitive display surface. To provide vision functionality, the optical system 104 may be configured to capture at least a partial image of objects placed on or near the touch-sensitive display surface such as fingers, electronic devices, paper cards, food, or beverages, for example. Accordingly, the optical system 104 may be configured to illuminate such objects and to detect the light reflected from the objects. In this manner, the optical system may register the position, footprint, distance of the object from the surface, and other properties of any suitable object placed on or near the touch-sensitive display surface.

The computing system further includes data-holding subsystem 112 may include a computer-readable medium such as an optical memory device (e.g., CD, DVD, HD-DVD, Blu-Ray Disc, etc.), a semiconductor memory device (e.g., RAM, EPROM, EEPROM, etc.) and/or a magnetic memory device (e.g., hard disk drive, floppy disk drive, tape drive, MRAM, etc.), among others. Data-holding subsystem 112 may include devices with one or more of the following characteristics: volatile, nonvolatile, dynamic, static, read/write, read-only random access, sequential access, location addressable, file addressable, and content addressable. In some embodiments, the data-holding subsystem 112 may be in the form of removable computer-readable storage media, which may be used to store and/or transfer data and/or instructions executable to implement the herein described methods and processes. Removable computer-readable storage media may take the form of CDs, DVDs, HD-DVDs, Blu-Ray Discs, EEPROMs, and/or floppy disks, among others.

Figure 2:
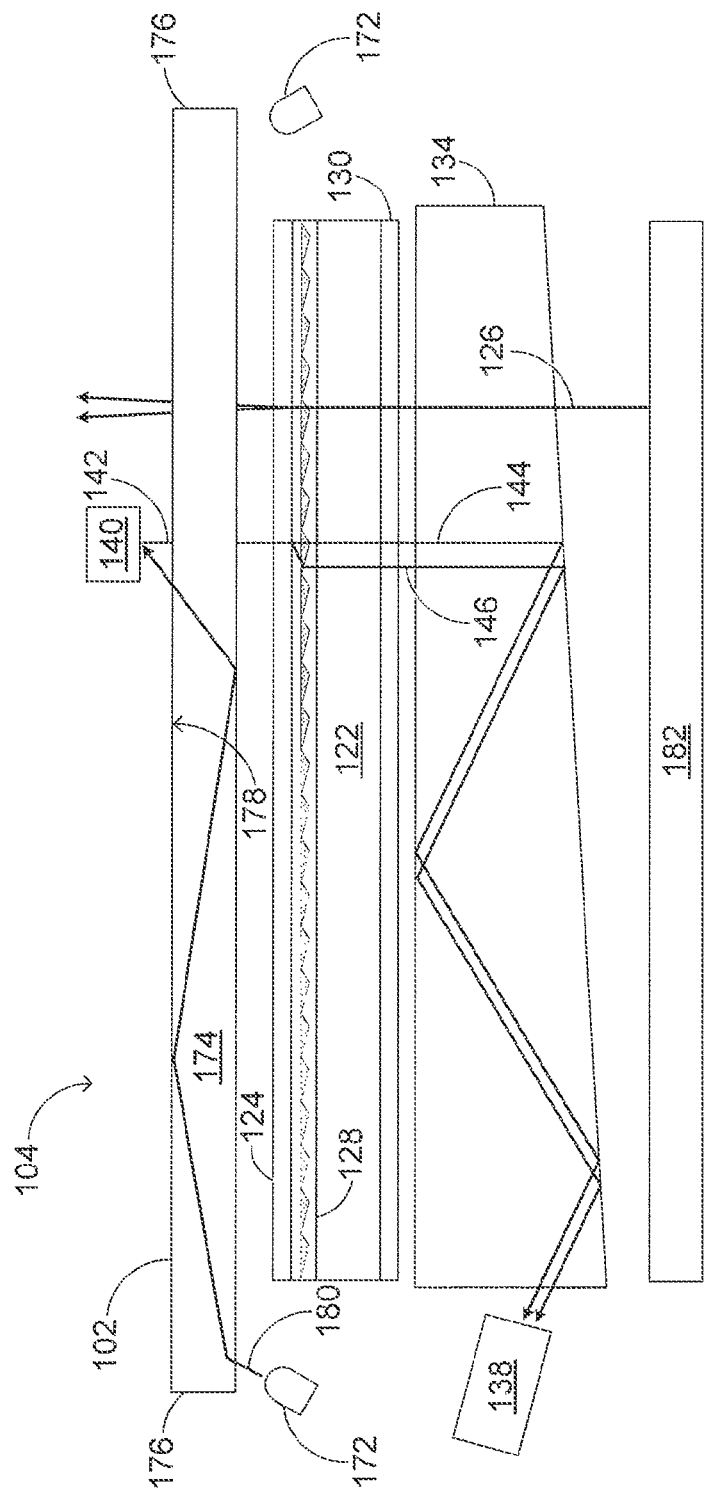
FIG. 2 shows a block diagram of an example optical system for an interactive display device in accordance with an embodiment of the present disclosure.

FIG. 2 schematically illustrates an example optical system 104 that may be used in an interactive display device, such as interactive display device 100 described above with reference to FIG. 1. In the illustrated example, optical system 104 includes an infrared (IR) light source, a wedge-shaped light guide 134, a liquid crystal display (LCD) device which includes an LCD 122 and a polarizer 130, and a birefringent prism 128.

LCD 122 may be an electronically-modulated optical device that is made up of a number of pixels filled with liquid crystals that rotate in response to an applied voltage. In some examples, each pixel may have a red, a green, and a blue subpixel created by a filter, for example, which may be modulated with respect to color and intensity to display an image on the surface 102 of the interactive display device when the LCD 122 is illuminated by a backlight 182, which may be any illuminant configured to emit visible light 126 upward toward the surface 102 of the interactive display device, in some embodiments, the LCD 122 includes a visible light polarizer on either side of the liquid crystal layer (not shown) such that visible light is polarized when passing through the LCD 122. The LCD 122 may further include a transparent electrode (not shown) so that each pixel may be modulated. Further, the LCD 122 may be modulated such that all pixels are on (e.g., all white) and all pixels are off (e.g., all black) at a high switching speed. For example, the switching speed of the LCD 122 may be 240 Hz or the LCD may switch in 2.5-5 ms.

Further, the LCD device includes a polarizer 130 positioned below the LCD 122 which polarizes light exiting the LCD 122 and travelling toward the wedge-shaped light guide 134. For example, the polarizer 130 may be an infrared polarizer which only polarizes light with a wavelength in the IR range. In such an example, the polarizer 130 may be in addition to the visible light polarizers positioned on either side of the liquid crystal layer. As another example, the polarizer 130 may be a Vikuti™ Dual Brightness Enhancement Film (DBEF) made by 3M™ which polarizes both visible and IR light and allows one polarization through and reflects the other. As such, visible light from the backlight 182 which illuminates the display may not be polarized by the polarizer 130. Further, the polarizer 130 may be a parallel polarizer which only allows light in a parallel-polarized state to pass through or a perpendicular polarizer which only allow light in a perpendicular-polarized state to pass through. The high switching speed of the LCD 122 rapidly rotates the polarization state of light passing through the LCD 122 such that a polarization state that passes through the polarizer 130 changes. For example, when the pixels of the LCD 122 are off such that the polarization state of a ray passing through the LCD 122 is not rotated, only rays having a polarization state that matches that of the polarizer 130 pass through the polarizer 130 to wedge-shaped light guide 134 (e.g., if the polarizer 130 is a parallel polarizer, and only parallel-polarized rays pass through and perpendicular polarized rays are absorbed). On the other hand, when the pixels of the LCD 122 are on such that the polarization state of a ray passing through the LCD 122 is rotated, only rays having a polarization that is initially (e.g., before entering LCD 122) opposite the polarization of the polarizer 130 pass through the polarizer 130 to wedge-shaped light guide 134. In this way, the LCD 122 may be modulated so that detector 138 detects an ordinary ray (e.g., perpendicular-polarized ray) 144 or an extraordinary ray (e.g., parallel-polarized ray) 146 passing through the LCD device.

As shown in the example of FIG. 2, the optical system 104 of the interactive display device further includes a diffuser 124. The diffuser 124 may be used to provide backlight uniformity, for example. In some embodiments, the diffuser 124 may be a switchable diffuser, such as a polymer dispersed liquid crystal diffuser (PDLC) diffuser, which may be switched between diffuse and non-diffuse states. For example, the switchable diffuser may be switched to a diffuse state to maintain uniformity of the display during, times when the backlight 182 is on and the display subsystem is utilized to an image is displayed on the surface 102 of the interactive display device. The switchable diffuser may be switched to a non-diffuse state when the backlight 182 is off and the vision subsystem is utilized to sense an object on or above the surface 102 of the interactive display device.

In other embodiments, the backlight 182 may be an edge lit plate, for example, which is positioned between the wedge-shaped light guide 134 and the LCD 122, in such an embodiment, the switchable diffuser may be positioned between the backlight 182 and the polarizer 130.

Further, in the embodiment illustrated in FIG. 2, the vision subsystem provides light via diffuse illumination of the objects, for example object 140, and the light is reflected back through the touch-sensitive display surface. Thus, FIG. 2 shows emitters 172, which may be infrared (IR) light-emitting diodes, for example, and illuminating; light guide 174. In the configuration illustrated in FIG. 2, the illuminating light guide 174 is configured to illuminate the one or more objects from underneath the touch-sensitive display surface. The illuminating light guide may be any optic configured to admit infrared light from one or more entry zones 176 and to project at least some of the infrared light from exit zone 178. It should be understood the embodiment illustrated in FIG. 2 is an example, and the emitters 172 and the light guide 174 may have any suitable configuration and, further, that numerous other illumination configurations are possible, and are equally consistent with the present disclosure.

In the example of FIG. 2, an IR light ray 180 is shown illuminating the object 140 above the surface 102 of the interactive display device. The object 140 reflects a light ray (e.g., an IR light ray when the emitters 172 are IR light emitters) 142 back through the surface 102 of the interactive display device and through diffuser 124, which may be in a non-diffuse state when a switchable diffuser is used. Further, the reflected light ray 142 passes through a birefringent prism 128 and is split into two rays travelling in two different directions, a first refracted ray (e.g., an ordinary ray with perpendicular polarization) 144 and a second refracted ray (e.g., an extraordinary ray with parallel polarization) 146 based on polarization state of the reflected light ray 142, as will be described in greater detail below with reference to FIG. 3. Visible light from the backlight 182 that exits the surface 102 for the display may be polarized by visible light polarizers (not shown) positioned on either side of the LCD 122. The visible light polarizers may be parallel to the birefringent prism 128, for example, such that the birefringent prism 128 may not affect the direction of travel of visible light exiting the optical system 104.

The refracted light rays 144 and 146 pass through the LCD 122 and then the polarizer 130 based on a polarization state of the light ray and the polarizer 130, as described above. The refracted light rays 144 and 146 then enter a wedge-shaped light guide 134 which focuses an image (e.g., an IR light image) on a detector 138 positioned at a wide end of the wedge-shaped light guide 134. The detector may be a camera, such as an infrared-sensitive, digital camera, for example. The wedge-shaped light guide 134 may be a tapered sheet of optically transparent material, such as poly(methyl methacrylate) (PMMA) or acrylic, for example.

It should be understood, that no aspect of FIG. 2 is intended to be limiting, because numerous wedge-shaped light guide, LCD, backlight, diffuser, and object illumination variants are contemplated. Further, various components of the optical system 104 may further include features such as turning films, diffuser films, wavelength-selective reflectors, etc. to selectively control the direction of light passing through the components.

Figure 3:
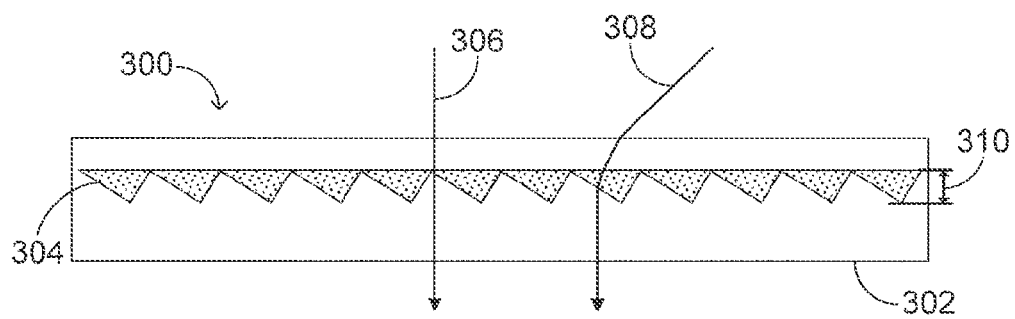
FIG. 3 shows an example birefringent prism in accordance with au embodiment of the present disclosure.

Continuing to FIG. 3, it shows an example of a birefringent prism 300, such as the birefringent prism 128 described above with reference to FIG. 2. As depicted in the example of FIG. 3, the birefringent prism 300 includes a sawtooth-shaped region 304 and a bulk region 302. The sawtooth-shaped region may be filled with a liquid crystal material, for example. As shown, the sawtooth-shaped region 304 forms a Fresnel-like lens within the birefringent prism 300. The bulk region 302 of the birefringent prism 300 may be made of a solid polymer with a refractive index that is substantially equal to the ordinary index of the liquid crystal material, for example. Further, a peak-to-valley height 310 of the sawtooth-shaped region may be substantially equivalent to a multiple of one wavelength of the incoming IR light that is reflected from an object above the surface divided by a birefringence of the birefringent prism 300. The birefringence of the birefringent prism 300 is the difference in refractive index between the extraordinary index of the liquid crystal material and the ordinary index of the bulk region 302 of the birefringent prism 300. For example, if the peak-to-valley height 310 of the sawtooth-shaped region has a depth substantially equal to wavelength (e.g., a wavelength of the incoming IR light) divided by birefringence of the birefringent prism, the rays passing through the birefringent prism constructively interfere and there is little scatter due to diffraction, which is a desirable condition.

Further, the example illustrated in FIG. 3 shows an ordinary ray (e.g., perpendicular-polarized ray) 306 and an extraordinary ray (e.g., parallel-polarized ray) 308 passing through the birefringent prism. As shown, the ordinary ray 306 passes through the birefringent prism 300 without a change in direction. In contrast, the direction of the extraordinary ray 308 is changed as is enters the birefringent prism 300, and further changed upon entering and exiting the sawtooth-shaped region 304 filled with a liquid crystal material. An amount the direction of travel of the extraordinary ray is changed may depend on the angle of the sawtooth-shaped region through which the extraordinary ray passes and/or the ordinary index of the liquid crystal material, for example.

Thus, a birefringent prism with a sawtooth-shaped region filled with a liquid crystal material may be used to refract an incoming ray of light into two rays travelling in two different directions.

Figure 4:
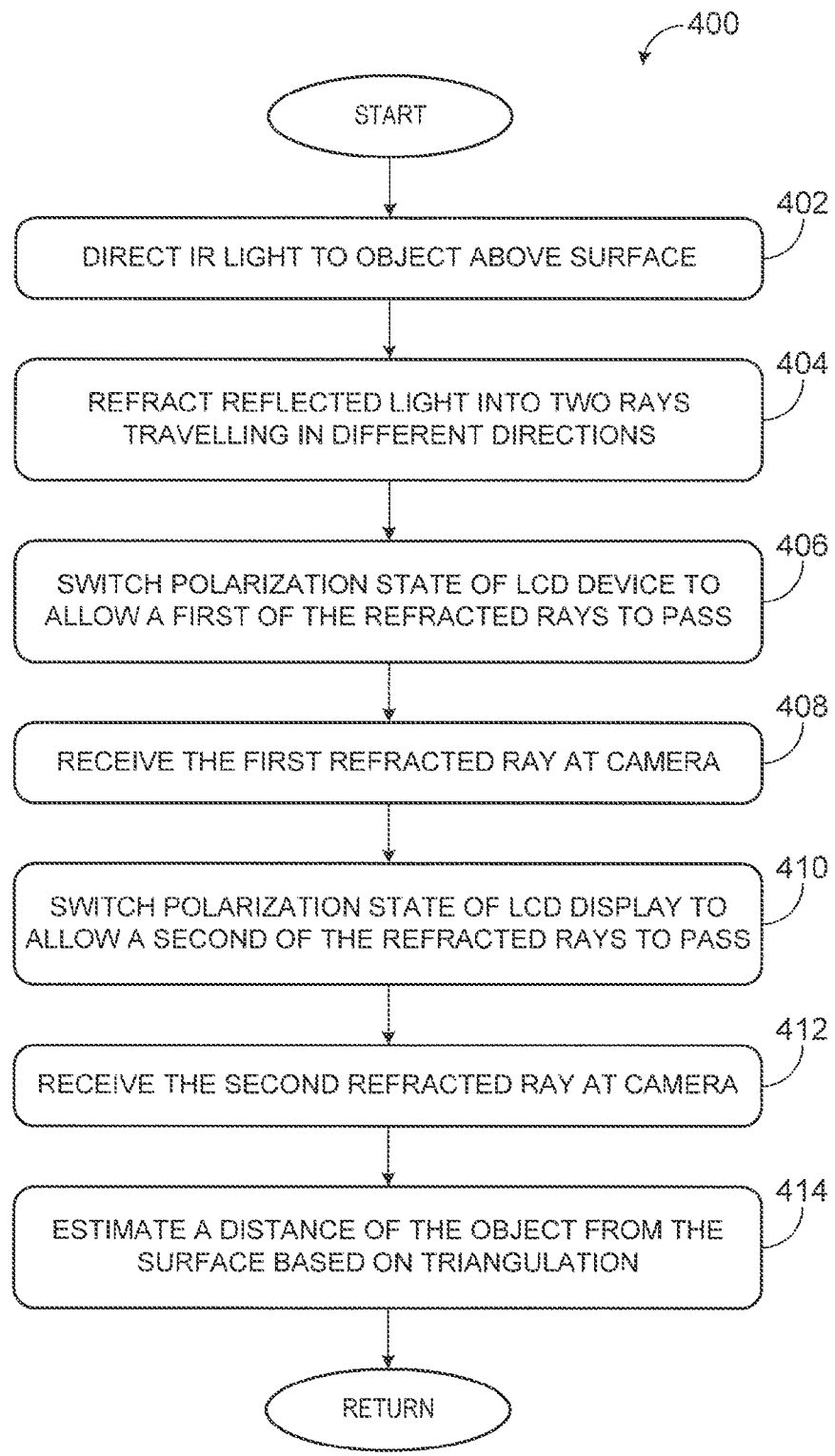
FIG. 4 shows an example method for an interactive display device in accordance with an embodiment of the present disclosure.

Continuing to FIG. 4, it shows an example method 400 for an interactive display device with a computing system and an optical system, such as the interactive display device 100 described above with reference to FIG. 1. Specifically, method 400 determines a distance of an object from a surface of the interactive display device based on parallax data.

At 402 of method 400, IR light is directed to the object above the surface. For example, as described above, IR light may be directed to the object above the surface via IR light-emitting diodes.

Light that is reflected back to the interactive display device from the object is refracted into two rays travelling in two different directions at 404 of method 400. For example, the IR light that is reflected from the object may be refracted into two rays based on a polarization state of the reflected light by a birefringent prism, such as birefringent prism 128 or birefringent prism 300 described above with reference to FIGS. 2 and 3, respectively. In some examples, the reflected IR light may be refracted into an ordinary ray (e.g., perpendicular-polarized ray) with a direction of travel that remains unchanged by the birefringent prism and an extraordinary ray (e.g., parallel-polarized ray) that has a direction of travel that is shifted by the birefringent prism (e.g., direction of travel is shift by 10 degrees from the initial direction of travel). In other examples, each of the two refracted rays may be shifted from their initial direction of travel. In this manner, the ordinary ray and the extraordinary ray enter the LCD at different positions.

At 406 of method 400, a polarization state of the LCD device is switched to allow a first of the two refracted rays to pass through the LCD device. For example, a voltage may be applied to the LCD such that the polarization state of light passing through the LCD is rotated (e.g., from perpendicular to parallel) and the first of the two refracted rays can pass through a polarizer (e.g., a parallel polarizer) positioned below the LCD in the LCD device. In some examples, the first of the two refracted rays may be the ordinary ray, for example. When the extraordinary ray is rotated by the LCD it is rotated to a perpendicular state and it cannot pass through the parallel polarizer. In this manner, only one of the polarization states passes through the LCD device.

Once the first of the two refracted rays passes through the LCD device, it travels through the wedge-shaped light guide and is received by the camera positioned at an end of the wedge-shaped light guide (e.g., the wide end) at 408 of method 400 in FIG. 4.

At 410 of method 400, the polarization state of the LCD device is switched to allow a second of the two refracted rays to pass through the LCD device. For example, the voltage supplied to the LCD device is turned off such that the polarization state of light passing through the LCD is not rotated and the second of the two refracted rays can pass through the polarizer positioned below the LCD in the LCD device. For example, if the second of the two refracted ray is the extraordinary ray and the polarizer is a parallel polarizer, the extraordinary ray maintains its parallel polarization state when it passes through the LCD and it can then pass through polarizer while the ordinary ray maintains its perpendicular polarization state and it cannot pass through the parallel polarizer. In this manner, only the other of the two polarization states passes through the LCD device.

Once the second of the two refracted rays passes through the LCD device, it travels through the wedge-shaped light guide and is received by the camera positioned at an end of the wedge-shaped light guide (e.g., the wide end) at 408 of method 400 in FIG. 4.

In some examples, method 400 may further include control of a switchable diffuser and a backlight, such as the diffuser 124 and the backlight 182 described above with reference to FIG. 2, so that the LCD is modulated between the display subsystem and the vision subsystem at a high switching rate, as described above. For example, in a first state, the backlight is on and an image is displayed on the surface of the interactive display device while the camera shutter is closed. In a second state, the backlight is turned off, a voltage is applied to the LCD so that the liquid crystals are rotated, and the camera shutter is open thereby capturing an IR image of the ordinary ray, for example. In a third state, the backlight is turned on and an image is displayed on the surface, and the camera shutter is closed. In a fourth state, the backlight is turned off, a voltage is not applied to the LCD so that the liquid crystals are not rotated, and the camera shutter is open thereby capturing an IR image of the extraordinary ray.

Because the birefringent prism refracts the reflected ray from the object above the surface into two rays travelling in two different directions, the position at which each ray enters and passes through the LCD is different. As such, an image generated by the camera from the second of the two refracted rays (e.g., the extraordinary ray) may be shifted from the image generated by the camera from the first of the two refracted rays (e.g., the ordinary ray). In this manner, a distance of the object from the surface of the interactive display device may be estimated based on triangulation of the parallax data at 414 of method 400, as two separate images are seen by a single camera from two different points of view.

Thus, an interactive display device which includes a single camera and a birefringent prism may be used to determine a distance from a surface of the interactive display device of an object near the surface of the interactive display device.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for determining a distance of an object from a surface of an interactive display device with a liquid crystal display (LCD) device, the method comprising:
   directing infrared (IR) light to the object above the surface of the interactive display device, the IR light being reflected by the object back to the interactive display device;
   refracting IR light reflected from the object into two rays travelling in two different directions based on a polarization state of the reflected IR light;
   switching a polarization state of the LCD device to allow a first of the two refracted rays to pass through the LCD device;
   receiving, at a detector, the first of the two refracted rays that passes through the LCD device;
   switching the polarization state of the LCD device to allow a second of the two refracted rays to pass through the LCD device;
   receiving, at the detector, the second of the two refracted rays that passes through the LCD device; and
   estimating the distance of the object from the surface of the interactive display device based on triangulation.

2. The method of claim 1, wherein the IR light reflected from the object is refracted into the two rays travelling in two different directions by a birefringent prism.

3. The method of claim 2, wherein the birefringent prism includes a sawtooth-shaped region which is filled with a liquid crystal material, the sawtooth-shaped region having a height equivalent to a multiple of a wavelength of the reflected IR light divided by a birefringence of the birefringent prism.

4. The method of claim 2, wherein a direction of travel of the first of the two refracted rays remains unchanged by the birefringent prism and a direction of travel of the second of the two refracted rays is changed by the birefringent prism.

5. The method of claim 1, wherein the LCD device includes an LCD and a polarizer, and switching the polarization state of the LCD includes applying a voltage to the LCD such that the LCD rotates a polarization of a ray passing through the LCD.

6. The method of claim 1, wherein the detector is a camera, and an image generated from the second of the two refracted rays is shifted from an image generated from the first of the two refracted rays based on a difference in direction of travel between the two refracted rays.

7. An interactive display device with a computing system, comprising:
   a display subsystem of the computing system configured to display an image on a surface of the interactive display device with which a user interacts;
   a vision subsystem of the computing system configured to detect an object above the surface of the interactive display device;
   an optical system, comprising:
      an infrared (IR) light source which directs IR light toward the object;
      a birefringent prism configured to split an incoming ray of IR light reflected from the object into two rays of light travelling in two different directions based on a polarization state of the incoming ray of IR light;
      a liquid crystal display (LCD) device including an LCD and a polarizer;
      a wedge-shaped light guide; and
      a detector coupled to an end of the wedge-shaped light guide; and
      a computer-readable device comprising instructions executable by the computing system to switch a polarization state of the LCD so that IR light in one polarization state passes through the LCD while IR light in another polarization state is absorbed by the LCD, and to estimate a distance of the object from the surface of the interactive display device based on triangulation.

8. The interactive display device of claim 7, wherein the wedge-shaped light guide focuses an image generated from IR light passing through the LCD device on the detector, the detector coupled to a wide end of the wedge-shaped light guide.

9. The interactive display device of claim 7, wherein the birefringent prism splits the incoming ray of IR light into an ordinary ray and an extraordinary ray, and a direction of travel of the ordinary ray is unchanged and a direction of travel of the extraordinary ray is shifted from that of the ordinary ray.

10. The interactive display device of claim 9, wherein triangulation is carried out by the computing system based on a shift in an image generated by the detector for the extraordinary ray from an image generated by the detector for the ordinary ray.

11. The interactive display device of claim 7, wherein the birefringent prism includes a sawtooth-shaped region filled with a liquid crystal material, the sawtooth-shaped region having a peak-to-valley height equivalent to a multiple of one wavelength of the incoming ray of IR light divided by a birefringence of the birefringent prism, the incoming ray of IR light being the ray of IR light reflected from the object above the surface of the interactive display device.

12. The interactive display device of claim 7, further comprising a switchable diffuser made of polymer dispersed liquid crystal, and the computer-readable device further comprising instructions for switching the switchable diffuser between a diffuse state and a non-diffuse state.

13. The interactive display device of claim 12, wherein, in the diffuse state, the display subsystem is active to display the image on the surface of the interactive display device and, in the non-diffuse state, the vision subsystem is active to detect a location of an object on or above the surface of the interactive display device.

14. The interactive display device of claim 12, wherein the display subsystem comprises a display backlight configured to illuminate the LCD device by directing visible light toward the LCD device, and the computer-readable device further comprises instructions for switching the display backlight on during the diffuse state of the switchable diffuser and turning the display backlight off during the non-diffuse state of the switchable diffuser.

15. An interactive display device, comprising:
an infrared light source positioned to emit light away from a surface of the interactive display device and toward an object positioned above the surface of the interactive display device;
a birefringent prism which includes a sawtooth-shaped region that is filled with liquid crystal, the birefringent prism configured to cause an incoming ray of light reflected from the object above the surface of the interactive display device to be refracted into two rays travelling in different directions based on a polarization state of the incoming ray of light reflected from the object;
a liquid crystal display (LCD) device positioned below the birefringent prism, the LCD device including an LCD and a polarizer;
a wedge-shaped light guide positioned below the LCD device;
a camera positioned at a wide end of the wedge-shaped light guide so that the camera receives refracted rays of light from the birefringent prism; and
a computer-readable device comprising instructions executable by a computing device to switch a polarization state of the LCD so that light in one polarization state passes through the LCD while light in another polarization state is absorbed by the LCD, and to estimate a distance of the object from the surface of the interactive display device based on triangulation.

16. The interactive display device of claim 15, wherein the birefringent prism splits the incoming ray of light into an ordinary ray and an extraordinary ray, and a direction of travel of the ordinary ray is unchanged and a direction of travel of the extraordinary ray is shifted from that of the ordinary ray.

17. The interactive display device of claim 16, wherein an image generated by the camera from the extraordinary ray is shifted from an image generated by the camera from the ordinary ray based on a shift of the extraordinary ray from the ordinary ray.

18. The interactive display device of claim 15, further comprising a switchable diffuser positioned above the birefringent prism configured to switch between a non-diffuse state through which IR light passes and a diffuse state through which visible light passes.

19. The interactive display device of claim 18, further comprising a display backlight positioned below the wedge-shaped light guide configured to illuminate the LCD device by directing visible light toward the LCD device, and wherein the computer-readable device further comprises instructions for switching the display backlight on during the diffuse state of the switchable diffuser and turning the display backlight off during the non-diffuse state of the switchable diffuser.

20. The interactive display device of claim 19, wherein the computer-readable device further comprises instructions for opening a shutter of the camera during the non-diffuse state when the backlight is off and closing the shutter of the camera during the diffuse state when the backlight is on.

* * * * *